United States Patent
Yen et al.

(10) Patent No.: US 6,950,379 B2
(45) Date of Patent: Sep. 27, 2005

(54) BURST CUTTING AREA EXTRACTION METHOD AND DEVICE

(75) Inventors: Chung-Tien Yen, Peng-Hu Hsien (TW); Po-Jen Shen, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 214 days.

(21) Appl. No.: 10/249,288

(22) Filed: Mar. 28, 2003

(65) Prior Publication Data

US 2004/0190420 A1 Sep. 30, 2004

(51) Int. Cl.[7] .................................................. G11B 7/00
(52) U.S. Cl. ................ 369/52.1; 369/47.28; 369/47.35; 369/53.34
(58) Field of Search ........................... 369/53.28, 53.35, 369/47.36, 47.3, 53.34, 47.35, 47.28, 52.1

(56) References Cited

U.S. PATENT DOCUMENTS

| | | | |
|---|---|---|---|
| 5,696,745 A | | 12/1997 | Yamawaki |
| 6,034,934 A | * | 3/2000 | Miyake et al. ............ 369/53.28 |
| 6,034,937 A | | 3/2000 | Kumagai |
| 6,414,920 B1 | | 7/2002 | Lee |
| 6,618,333 B1 | * | 9/2003 | Chou et al. .............. 369/47.36 |
| 2001/0030932 A1 | | 10/2001 | Spruit et al. |
| 2002/0057638 A1 | * | 5/2002 | Chou et al. .............. 369/53.35 |
| 2002/0087814 A1 | | 7/2002 | Ripley et al. |
| 2002/0191510 A1 | * | 12/2002 | Senshu ..................... 369/47.35 |
| 2003/0016603 A1 | * | 1/2003 | Tomita ...................... 369/47.3 |
| 2004/0066723 A1 | * | 4/2004 | Hou et al. ............... 369/53.34 |

FOREIGN PATENT DOCUMENTS

| | | |
|---|---|---|
| JP | 10255269 A2 | 9/1998 |
| JP | 2000243037 A2 | 9/2000 |

* cited by examiner

*Primary Examiner*—W. R. Young
*Assistant Examiner*—Kyung D. Kim
(74) *Attorney, Agent, or Firm*—Winston Hsu

(57) ABSTRACT

A method for extracting information in a data signal stored on an optical disc. The information is stored in a plurality of channel bits. The method includes initializing a recovery period of a recovery clock to a predetermined value expressed in cycles of a first clock; sampling the data signal with the first clock; obtaining a leading edge time period expressed in cycles of the first clock of a pattern of bits from the sampled data in which at least a first bit has a first binary value, followed by a plurality of bits having a second binary value, and ending with a last bit having the first binary value, wherein the first and second binary values are not equal; updating the recovery period of the recovery clock to be equal to a new maximum period that is the leading edge time period divided by a division factor; extracting the information in the data signal based on the newest recovery period of the recovery clock; and detecting a predetermined code in the data signal.

20 Claims, 11 Drawing Sheets

| SB$_{BCA}$ | BCA PREAMBLE (4BYTE 0x00) | | | |
|---|---|---|---|---|
| RS$_{BCA1}$ | I$_0$ | I$_1$ | I$_2$ | I$_3$ |
| RS$_{BCA1}$ | I$_4$ | I$_5$ | I$_6$ | I$_7$ |
| RS$_{BCA1}$ | : | : | : | : |
| RS$_{BCA1}$ | : | : | : | : |
| RS$_{BCA2}$ | : | : | : | : |
| : | : | : | Information | : |
| RS$_{BCAn-1}$ | : | : | : | : |
| RS$_{BCAn}$ | : | : | : | : |
| RS$_{BCAn}$ | I$_{16n-12}$ | I$_{16n-11}$ | I$_{16n-10}$ | I$_{16n-9}$ |
| RS$_{BCAn}$ | I$_{16n-8}$ | I$_{16n-7}$ | I$_{16n-6}$ | I$_{16n-5}$ |
| RS$_{BCAn}$ | EDC$_{BCA}$ (4 bytes) | | | |
| RS$_{BCA13}$ | C$_{0,0}$ | C$_{1,0}$ | C$_{2,0}$ | C$_{3,0}$ |
| RS$_{BCA13}$ | C$_{0,1}$ | C$_{1,1}$ | C$_{2,1}$ | C$_{3,1}$ |
| RS$_{BCA13}$ | C$_{0,2}$ | C$_{1,2}$ | C$_{2,2}$ | C$_{3,2}$ |
| RS$_{BCA13}$ | C$_{0,3}$ | C$_{1,3}$ | C$_{2,3}$ | C$_{3,3}$ |
| RS$_{BCA14}$ | BCA POSTAMBLE (4BYTE 0x55) | | | |
| RS$_{BCA15}$ | | | | |

Fig. 3 Prior art

| Sync Byte/ Resync | Bit pattern | | | | | | | | | | | |
|---|---|---|---|---|---|---|---|---|---|---|---|---|
| | Fixed pattern (Channel bit) | | | | | | | | Sync code (Data bit) | | | |
| | $C_{15}$ | $C_{14}$ | $C_{13}$ | $C_{12}$ | $C_{11}$ | $C_{10}$ | $C_9$ | $C_8$ | $b_3$ | $b_2$ | $b_1$ | $b_0$ |
| $SB_{BCA}$ | 0 | 1 | 0 | 0 | 0 | 1 | 1 | 0 | 0 | 0 | 0 | 0 |
| $RS_{BCA1}$ | 0 | 1 | 0 | 0 | 0 | 1 | 1 | 0 | 0 | 0 | 0 | 1 |
| $RS_{BCA2}$ | 0 | 1 | 0 | 0 | 0 | 1 | 1 | 0 | 0 | 0 | 1 | 0 |
| : | : | : | : | : | : | : | : | : | : | : | : | : |
| $RS_{BCAi}$ | 0 | 1 | 0 | 0 | 0 | 1 | 1 | 0 | | i | | |
| : | : | : | : | : | : | : | : | : | : | : | : | : |
| $RS_{BCA15}$ | 0 | 1 | 0 | 0 | 0 | 1 | 1 | 0 | 1 | 1 | 1 | 1 |
| | Recorded in RZ mod. | | | | | | | | Recorded in PE-RZ mod. | | | |

Fig. 4 Prior art

| SB$_{NBCA}$ | NBCA PREAMBLE (4BYTE 0x00) | | | |
|---|---|---|---|---|
| RS$_{NBCA1}$ | I$_0$ | I$_1$ | I$_2$ | I$_3$ |
| RS$_{NBCA1}$ | I$_4$ | I$_5$ | I$_6$ | I$_7$ |
| RS$_{NBCA1}$ | : | : | : | : |
| RS$_{NBCA1}$ | : | : | : | : |
| RS$_{NBCA2}$ | : | : | : | : |
| : | : | : | Information | : |
| RS$_{NBCAn-1}$ | : | : | : | : |
| RS$_{NBCAn}$ | : | : | : | : |
| RS$_{NBCAn}$ | I$_{16n-12}$ | I$_{16n-11}$ | I$_{16n-10}$ | I$_{16n-9}$ |
| RS$_{NBCAn}$ | I$_{16n-8}$ | I$_{16n-7}$ | I$_{16n-6}$ | I$_{16n-5}$ |
| RS$_{NBCAn}$ | EDC$_{NBCA}$ (4 bytes) | | | |
| RS$_{NBCA13}$ | C$_{0,0}$ | C$_{1,0}$ | C$_{2,0}$ | C$_{3,0}$ |
| RS$_{NBCA13}$ | C$_{0,1}$ | C$_{1,1}$ | C$_{2,1}$ | C$_{3,1}$ |
| RS$_{NBCA13}$ | C$_{0,2}$ | C$_{1,2}$ | C$_{2,2}$ | C$_{3,2}$ |
| RS$_{NBCA13}$ | C$_{0,3}$ | C$_{1,3}$ | C$_{2,3}$ | C$_{3,3}$ |
| RS$_{NBCA14}$ | NBCA POSTAMBLE (4BYTE 0x55) | | | |
| RS$_{NBCA15}$ | | | | |

Fig. 5 Prior art

| Sync Byte/ Resync | Bit pattern | | | | | | | | | | | |
|---|---|---|---|---|---|---|---|---|---|---|---|---|
| | Fixed pattern | | | | | | | | Sync code | | | |
| | (Channel bit) | | | | | | | | (Data bit) | | | |
| | $C_{15}$ | $C_{14}$ | $C_{13}$ | $C_{12}$ | $C_{11}$ | $C_{10}$ | $C_9$ | $C_8$ | $b_3$ | $b_2$ | $b_1$ | $b_0$ |
| $SB_{NBCA}$ | 0 | 1 | 0 | 0 | 0 | 1 | 1 | 0 | 0 | 0 | 0 | 0 |
| $RS_{NBCA1}$ | 0 | 1 | 0 | 0 | 0 | 1 | 1 | 0 | 0 | 0 | 0 | 1 |
| $RS_{NBCA2}$ | 0 | 1 | 0 | 0 | 0 | 1 | 1 | 0 | 0 | 0 | 1 | 0 |
| : | : | : | : | : | : | : | : | : | : | : | : | : |
| $RS_{NBCAi}$ | 0 | 1 | 0 | 0 | 0 | 1 | 1 | 0 | i | | | |
| : | : | : | : | : | : | : | : | : | : | : | : | : |
| $RS_{NBCA15}$ | 0 | 1 | 0 | 0 | 0 | 1 | 1 | 0 | 1 | 1 | 1 | 1 |
| | Recorded in RZ mod. | | | | | | | | Recorded in PE-RZ mod. | | | |

Fig. 6 Prior art

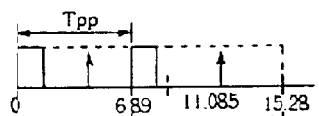
Fig. 9A 1T,Tpp=8.89-2=6.89
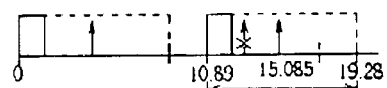
Fig. 9B 1T,Tpp=8.89+2=10.89
Fig. 9C 2T,Tpp=8.89*2-2=15.78
Fig. 9D 2T,Tpp=8.89*2+2=19.78
Fig. 9E 3T,Tpp=8.89*3-2=24.67
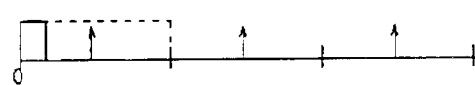
Fig. 9F 3T,Tpp=8.89*3+2=28.67
Fig. 9G 4T,Tpp=8.89*4-2=33.56
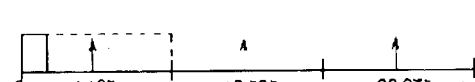
Fig. 9H 4T,Tpp=8.89*4+2=37.56

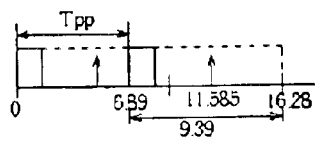
Fig. 10A 1T,Tpp=8.89-2=6.89
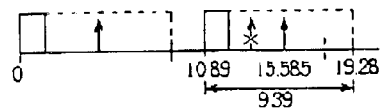
Fig. 10B 1T,Tpp=8.89+2=10.89
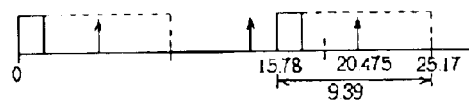
Fig. 10C 2T,Tpp=8.89*2-2=15.78
Fig. 10D 2T,Tpp=8.89*2+2=19.78
Fig. 10E 3T,Tpp=8.89*3-2=24.67
Fig. 10F 3T,Tpp=8.89*3+2=28.67
Fig. 10G 4T,Tpp=8.89*4-2=33.56
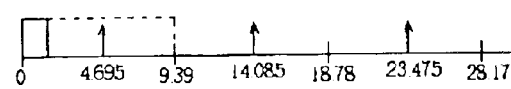
Fig. 10H 4T,Tpp=8.89*4+2=37.56

BURST CUTTING AREA EXTRACTION METHOD AND DEVICE

BACKGROUND OF INVENTION

1. Field of the Invention

The present invention relates to an optical disc apparatus, and more specifically, to a method for using an optical disc apparatus to extract information recorded in a BCA (burst cutting area) or NBCA (narrow burst cutting area, or non-burst cutting area) on a surface of an optical disc.

2. Description of the Prior Art

A BCA is an area arranged on the inner periphery of an optical disc. A BCA-Code, which is a series of low reflectance stripes, is formed in the BCA. The BCA is formed on a disc using a laser cutting process after the fabrication of the disc. Thus, the manufacturer can record desired information, in the form of the BCA-Code, on the disc. For example, the serial number of the disc or anti-counterfeit information can be recorded to the disc. Similar to the BCA, the NBCA also performs the same function as the BCA and stores data in the same format.

Different Digital Versatile Disc (DVD) formats now take advantage of the BCA and NBCA for protecting content stored on the DVD. Specifically, the DVD-RAM format uses the BCA, and the DVD-R and DVD-RW formats both use the NBCA to store information. If content in the DVD-RAM, DVD-R, and DVD-RW formats is to be protected, each will use the Content Protection for Recordable Media (CPRM) to protect the data. The DVD-RAM format will store data in the BCA format for utilizing CPRM, and the DVD-R and DVD-RW formats will store data in the NBCA format for utilizing CPRM. A different protection standard called Content Protection for Prerecorded Media (CPPM) is used for the DVD-ROM format. The DVD-ROM may contain BCA-Code, but no BCA-Code information is needed for utilizing CPPM. As will be shown below, the data structures for BCA-Code and NBCA-Code are identical, so the following description will be limited to the BCA for simplicity.

Typically, information including a sync byte and resync bytes are recorded on the BCA of a disc. The sync byte is adapted to indicate the start point of the BCA. Only one sync byte exists in the entire portion of the BCA. Each of the sync byte and resync bytes includes a fixed sync pattern and a sync code.

Please refer to FIG. 1. FIG. 1 is a block diagram illustrating an optical disc drive 100 according to the prior art. Information recorded on the surface of an optical disc 110 is reproduced by an optical pickup 114. The optical pickup 114 optically picks up the information recorded on a data recording surface of the optical disc 110 rotating in accordance with a drive force from the spindle motor 112 and then converts the picked-up information into an electrical signal, namely, a radio frequency (RF) signal.

The RF signal from the optical pickup 114 is applied to an RF amplifier unit 120. The optical pickup 114 moves radially between the inner and outer peripheries of the surface of the optical disc 110 in accordance with a drive force from a feeding motor 126. The RF amplifier unit 120 amplifies the RF signal from the optical pickup 114, and removes noise and distortion from the amplified signal through a waveform equalization circuit, thereby outputting a shaped RF signal. The shaped RF signal from the RF amplifier unit 120 is sent to an envelope detector and slicing unit 142, which transforms the RF signal from the BCA to a digitized signal BCA_RZ (BCA return-to-zero). The BCA_RZ signal is then sent to a BCA-Code processing unit 150 for extracting BCA-Code channel bits from the BCA_RZ signal and for performing sync and resync detection. This data is then sent to a BCA-Code decoding unit 144. The BCA-Code decoding unit 144 removes sync and resync bytes for extracting the data stored in the BCA-Code, performs phase encoded (PE) demodulation on the data, and performs an EDC or ECC check of the data contained in the BCA-Code. A DECODE_OK flag is sent to a microprocessor 140 for indicating the decoding status. Then, the data stored in the BCA-Code is stored in a dynamic random access memory (DRAM) 146.

A spindle motor control unit 128 controls rotation of the spindle motor 112. The spindle motor control unit 128 can operate under constant angular velocity (CAV) mode if the spindle motor 112 provides a feedback signal Fg to the spindle motor control unit 128, as will be explained below. If the feedback signal Fg is not provided to the spindle motor control unit 128, the spindle motor control unit 128 can operate under open loop mode by "kicking" the spindle motor 112 with a constant force when reading BCA-Code. The RF amplifier unit 120 also sends signals for focus and tracking servos, that is, a focus error signal FE and a tracking error signal TE, to a servo digital signal processor (DSP) 122. The servo DSP 122 applies control signals to a servo driving unit 124 for controlling a focus servo and a tracking servo, based on the focus error signal FE and tracking error signal TE, respectively. The servo driving unit 124 generates the drive voltages required to move the optical pickup 114, as well as to drive the tracking and focus servos, and applies the respective drive voltages to the optical pickup 114 and feeding motor 126, where the servos are located.

Please refer to FIG. 2. FIG. 2 is a diagram showing an example of a BCA_RZ signal train. BCA-Code information is stored in a series of channel bits, each representing a digital "1" or "0". Period T, shown from time t2 to t3, represents a time width of one channel bit. In the BCA_RZ (BCA return-to-zero) format, channel bits representing a digital "1" have an initial value of "1" that returns to "0" before the end of a period of that bit. For example, at time t1, the BCA_RZ signal has a leading edge with a value of "1" that returns to "0" before the channel bit period ends at time t2. For channel bits representing a digital "0", the BCA_RZ signal remains at "0" for the entire duration of the period of that bit. This is shown in channel bits ranging from time t2 to t3 and also from time t3 to t4. Therefore, FIG. 2 represents a BCA-Code of (1,0,0,1,0,0,0,1,1,0,1).

According to the specification of the BCA, T can be expressed in terms of a fixed clock CLKh that has a frequency Fh (in MHz) according to Eqn.1, $$T = \frac{8.89 * Fh}{r} \quad (1)$$

where r represents a rotation speed multiplier such as 2, 4, 8, etc, where the rotation speed is calculated as 24*r Hz, and where T is a time expressed in cycles of CLKh.

As can be seen in FIG. 2 from time t4 to t8, Tpp represents a time width between succeeding leading edges of the BCA_RZ signal. Also according to the BCA specification, Tpp can be expressed according to Eqn.2, $$Tpp = \frac{(8.89n \pm 2) * Fh}{r} \quad (2)$$

where n is an integer with a value of 1, 2, 3, or 4, and where Tpp is also a time expressed in cycles of CLKh.

The integer n represents the number of channel bit widths between succeeding leading edges of the BCA_RZ signal. For example, from t1 to t4, n would have a value of 3, from t4 to t8, n would have a value of 4, from t8 to t9, n would have a value of 1, and from t9 to t11, n would have a value of 2.

Based on Eqn.2, a new quantity Tppmax is used to describe a maximum value of Tpp throughout the BCA_RZ signal train, as expressed according to Eqn.3, $$\frac{33.56 * Fh}{r} \leq Tppmax \leq \frac{37.56 * Fh}{r} \quad (3)$$

wherein Tppmax is a time expressed in cycles of CLKh.

The formula shown in Eqn.3 is derived from Eqn.2 by setting n=4 and subtracting and adding the value of 2. As will be shown below, n can never be larger than 4, so the value of Tppmax is computed with n=4.

Please refer to FIG. 3 to FIG. 6. FIG. 3 and FIG. 4 illustrate tables of a recorded information state of the BCA. Recorded on the BCA are a sync byte, resync bytes, and a variety of information. The sync byte is denoted by SBBCA whereas each resync byte is denoted by RSBCA followed by a number from 1 to 15. FIG. 3 illustrates the configuration of the BCA. As shown, each piece of information recorded on the BCA is denoted by I, and C denotes an ECC parity. In FIG. 4, data structures of the sync byte and resync bytes, each of which consists of a fixed sync pattern and a sync code, are illustrated. In FIG. 3, the BCA has blocks each consisting of 16 information bytes designated as I. The BCA may have a maximum of 13 blocks. Each block of the BCA includes sub-blocks each containing 4 bytes of information. Every sub-block follows a resync byte. Accordingly, one information block consists of 4 resync bytes and 16 information bytes.

The sync byte is the first sync information indicative of the start position of the BCA. Accordingly, only one sync byte exists in the BCA. On the other hand, the resync byte is the second sync information adapted to provide a synchronization for 4 information bytes, for example, $I_0$, $I_1$, $I_2$, and $I_3$. As shown in FIG. 4, such a resync byte consists of a fixed sync pattern having a size of 8 channel bits and a sync code having a size of 4 data bits. The 8 channel bits are recorded with RZ (return-to-zero) modulation and the 4 data bits are recorded with PE-RZ (phase encoded return-to-zero) modulation, and actually contain two bits for every bit shown in FIG. 4. The fixed sync pattern is a particular pattern which is configured not to be detected from the general information area, but to be detected only from the sync and resync area. The sync code of each resync byte is a serial number allocated to an associated information block and adapted to distinguish the information block from other information blocks.

As shown in FIG. 4, the fixed pattern for channel bits is the same for the sync byte and resync bytes. In each of these sync and resync bytes, a (1,0,0,0,1) pattern is shown. Therefore, a period Tpp can be obtained from the sync and resync bytes in which the period between two successive leading edges would use the case of n=4, as seen in Eqn.2.

FIG. 5 and FIG. 6 illustrate tables of a recorded information state of the NBCA. Please note that the data structures for the BCA and the NBCA are identical, as shown in FIG. 3 to FIG. 6. Since the BCA and the NBCA have identical data structures, no further explanation will be given for the NBCA data structure.

SUMMARY OF INVENTION

It is therefore a primary objective of the claimed invention to provide a method for automatically recovering the time width T of one channel bit in order to read the BCA-Code quickly and easily.

According to the claimed invention, a method for extracting information in a data signal stored on an optical disc is provided. The information is stored in a plurality of channel bits. The method includes initializing a recovery period of a recovery clock to a first predetermined value expressed in cycles of a high frequency clock CLKh; sampling the data signal with the high frequency clock CLKh; obtaining a leading edge time period expressed in cycles of the high frequency clock CLKh of a pattern of bits from the sampled data in which at least a first bit has a first binary value, followed by a plurality of bits having a second binary value, and ending with a last bit having the first binary value, wherein the first and second binary values are not equal; updating the recovery period of the recovery clock to be equal to a new maximum period that is the leading edge time period divided by a division factor; extracting the information in the data signal based on the newest recovery period of the recovery clock; repeating the above steps until a predetermined code is detected in the data signal; and extracting the information in the data signal based on the finalized recovery period of the recovery clock.

It is an advantage of the claimed invention that the recovery period of the recovery clock can be calculated automatically and that the recovery clock can be used to extract the BCA-Code from the BCA of the optical disc. Thus, even for spindle motors that do not provide a feedback signal, the BCA-Code can quickly be read from the optical disc.

These and other objectives of the claimed invention will no doubt become obvious to those of ordinary skill in the art after reading the following detailed description of the preferred embodiment, which is illustrated in the various figures and drawings.

BRIEF DESCRIPTION OF DRAWINGS

FIG. 3 and FIG. 4 illustrate tables of a recorded information state of a BCA.

FIG. 5 and FIG. 6 illustrate tables of a recorded information state of a NBCA.

FIG. 9A through FIG. 9H are timing diagrams illustrating BCA-Code extraction according to the present invention method.

FIG. 10A through FIG. 10H are timing diagrams illustrating BCA-Code extraction according to the present invention method.

DETAILED DESCRIPTION

The present invention provides a method of determining a proper BCA channel bit width to be used by an optical disc drive for extracting BCA-Code. Even if a spindle motor of the optical disc drive does not provide a feedback signal to a spindle motor control unit, the present invention method is still capable of determining the proper BCA channel bit width.

The present invention makes use of the fact that rotation speed of the spindle motor varies very little among several (such as three or four) consecutive revolutions.

Please refer back to Eqns.1 to 3 above. Because Tppmax is about four times as large as T, the present invention sets T equal to Tppmax/4. Therefore, the present invention calculates Tppmax during first and second revolutions of the spindle motor, sets T equal to Tppmax/4, and uses this value of T for extracting and decoding BCA-Code.

Figure 1:
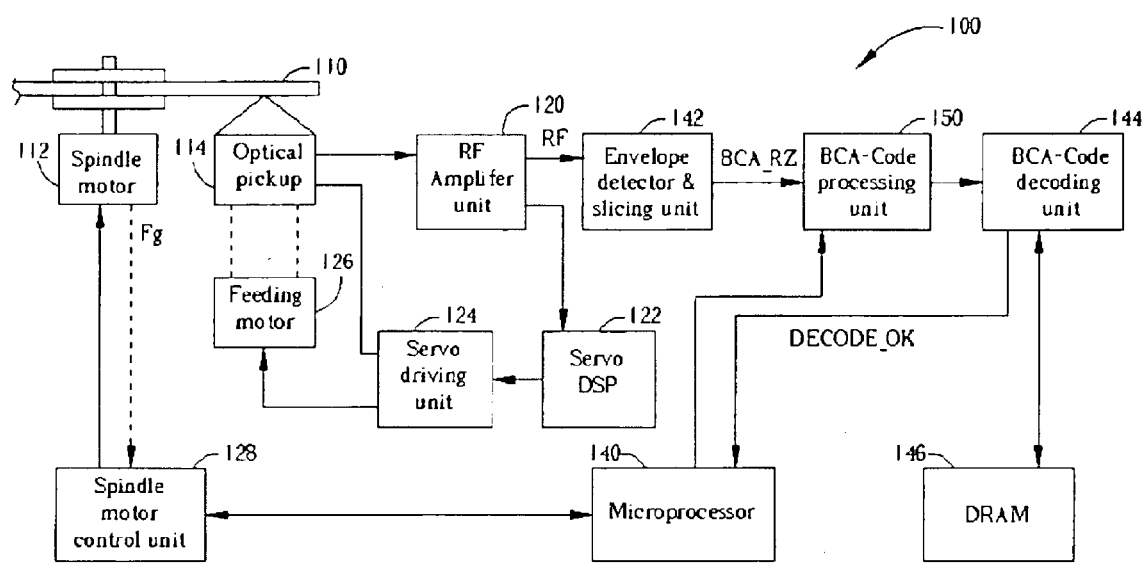
FIG. 1 is a block diagram illustrating an optical disc drive according to the prior art.
Figure 2:
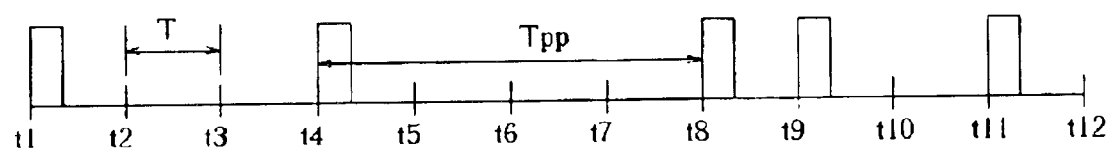
FIG. 2 is a diagram showing an example of a BCA_RZ signal train.
Figure 7:
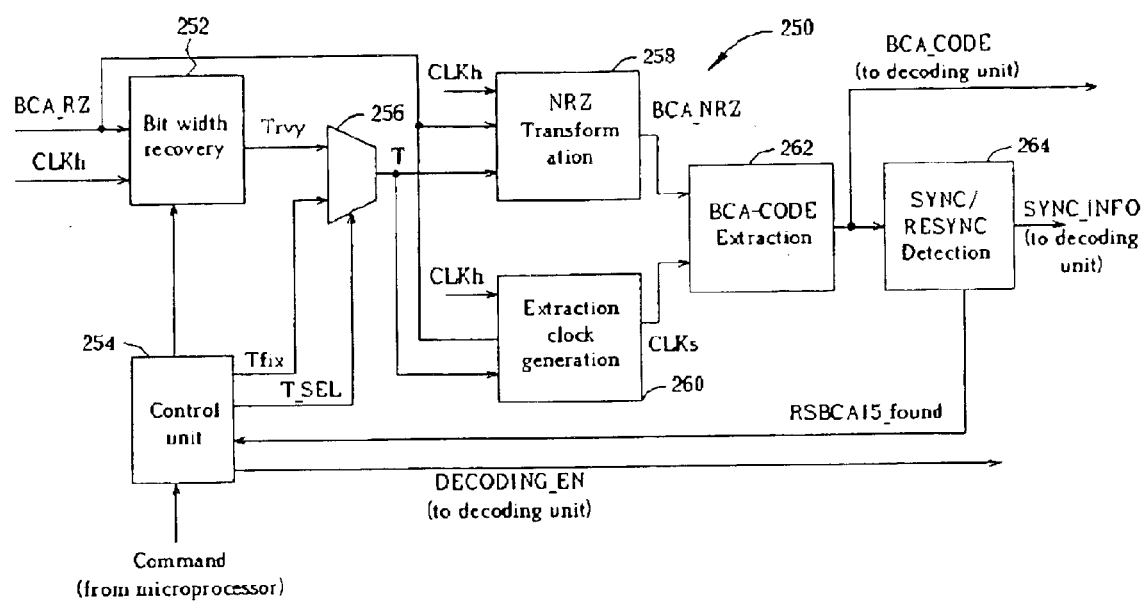
FIG. 7 is a BCA-Code processing unit according to the present invention.

Please refer to FIG. 7 with reference to FIG. 1. FIG. 7 is a BCA-Code processing unit 250 according to one embodiment of the present invention. All components in the optical disc drive 100 shown in FIG. 1 are used in the present invention except for the BCA-Code processing unit 150. With the exception of the BCA-Code processing unit 150, all other components will use the same reference numbers in the following description of the preferred embodiment. The BCA-Code processing unit 250 replaces the BCA-Code processing unit 150 of the prior art shown in FIG. 1.

The BCA-Code processing unit 250 in this embodiment contains a bit width recovery circuit 252, a control unit 254, a BCA extraction unit, and a sync/resync detection circuit 264. The BCA extraction unit includes an NRZ (non-return-to-zero) transformation circuit 258, an extraction clock generation circuit 260, and a BCA-Code extraction circuit 262.

The BCA-Code processing unit 250 contains the bit width recovery circuit 252 that receives a BCA_RZ (BCA return-to-zero) signal from the envelope detector and slicing unit 142 and a fixed clock CLKh that has a frequency Fh. The bit width recovery circuit 252 analyzes the BCA_RZ signal and calculates a largest value of Tppmax expressed in cycles of the fixed clock CLKh. Then, the bit width recovery circuit 252 outputs a value of Tppmax/4 as Trvy, which is a period of a recovery clock expressed in cycles of the fixed clock CLKh used to extract BCA-Code from the BCA_RZ signal.

The control unit 254 receives commands from the microprocessor 140 of the optical disc drive 100 and controls operation of the BCA-Code processing unit 250. If the spindle motor 112 provides the feedback signal Fg to the spindle motor control unit 128, this signal is also sent to the microprocessor 140. Then, the microprocessor 140 provides this information to the control unit 254 in the form of a fixed clock period Tfix, which represents the period of the BCA channel bit width expressed in cycles of the fixed clock CLKh that may be used to extract BCA-Code from the BCA_RZ signal.

A multiplexer 256 is controlled by a selection signal T_SEL outputted from the control unit 254 to select between the recovery clock period Trvy and the fixed clock period Tfix. Therefore, if the rotation speed of the spindle motor 112 is known, T can be set equal to Tfix. If the rotation speed is not known or if extraction of BCA-Code is to be performed without this information, the recovery clock period Trvy can be used instead for extracting the BCA-Code.

Based on the value of T used, the NRZ (non-return-to-zero) transformation circuit 258 is used to transform the BCA_RZ signal into a BCA_NRZ signal. The extraction clock generation circuit 260 uses the BCA_RZ signal and the value of T, and creates a extracting clock signal CLKs that will be used for sampling the BCA_NRZ signal at a fixed time within each channel bit time division. Both the BCA_NRZ signal and the extracting clock signal CLKs are fed into the BCA-Code extraction circuit 262 for extracting BCA-Code channel bits BCA_CODE from the BCA_NRZ signal. The BCA-Code channel bits BCA_CODE is then sent to the sync/resync detection circuit 264 for detecting sync byte SBBCA and resync bytes RSBCAn in the BCA-Code channel bits BCA_CODE. The BCA-Code channel bits BCA_CODE is also sent to the BCA-Code decoding unit 144 for decoding the data stored in the BCA-Code. When the sync/resync detection circuit 264 detects the resync byte RSBCA15, it outputs an RSBCA15_found flag to the control unit 254 for helping to control the BCA-Code extraction process. In addition, the sync/resync detection circuit 264 outputs a synchronization signal SYNC_INFO to the BCA-Code decoding unit 144 for helping to control the decoding process.

Figure 8A:
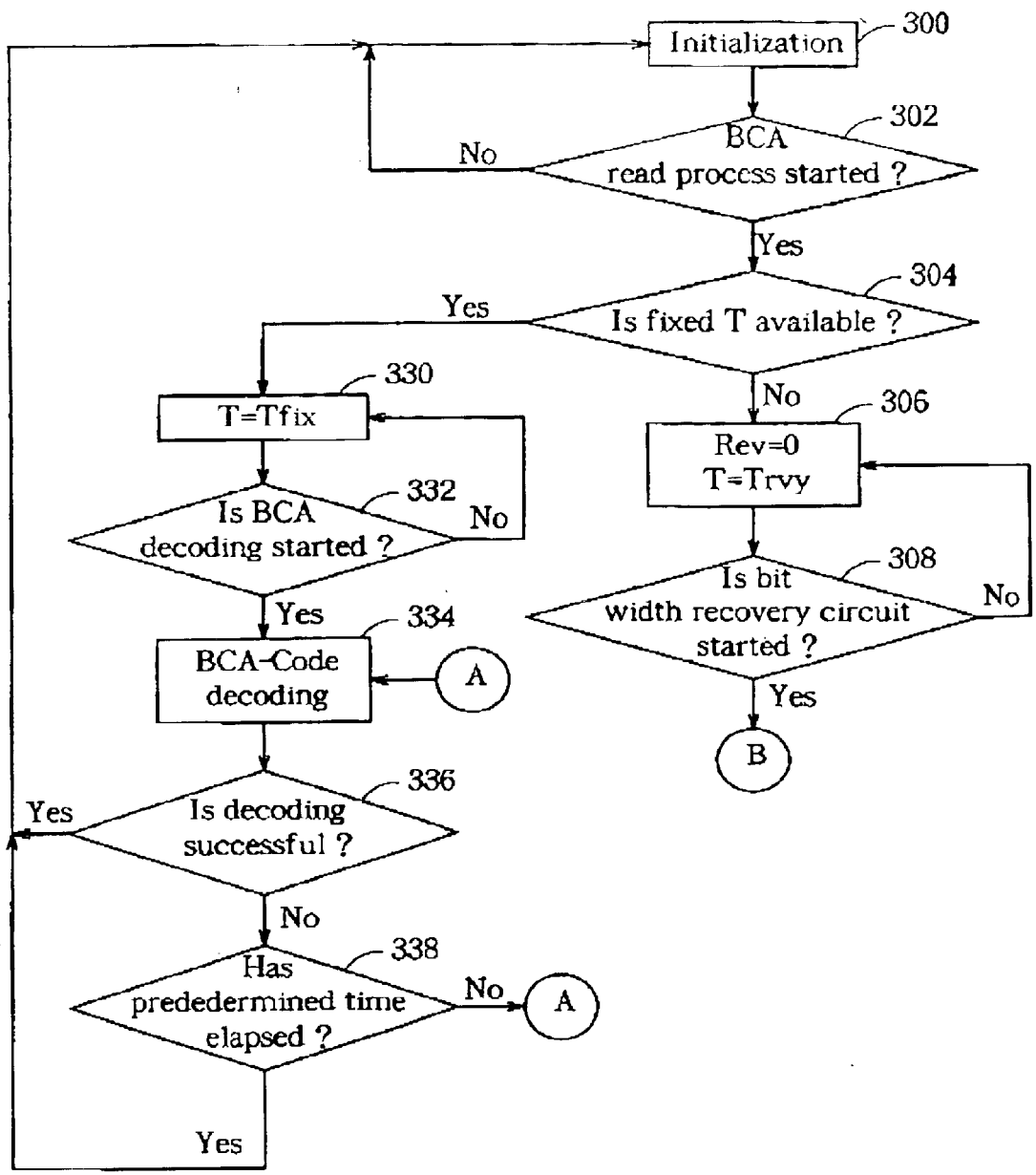
FIG. 8A and FIG. 8B contain a flowchart illustrating extracting and decoding BCA-Code according to the present invention method.
Figure 8B:
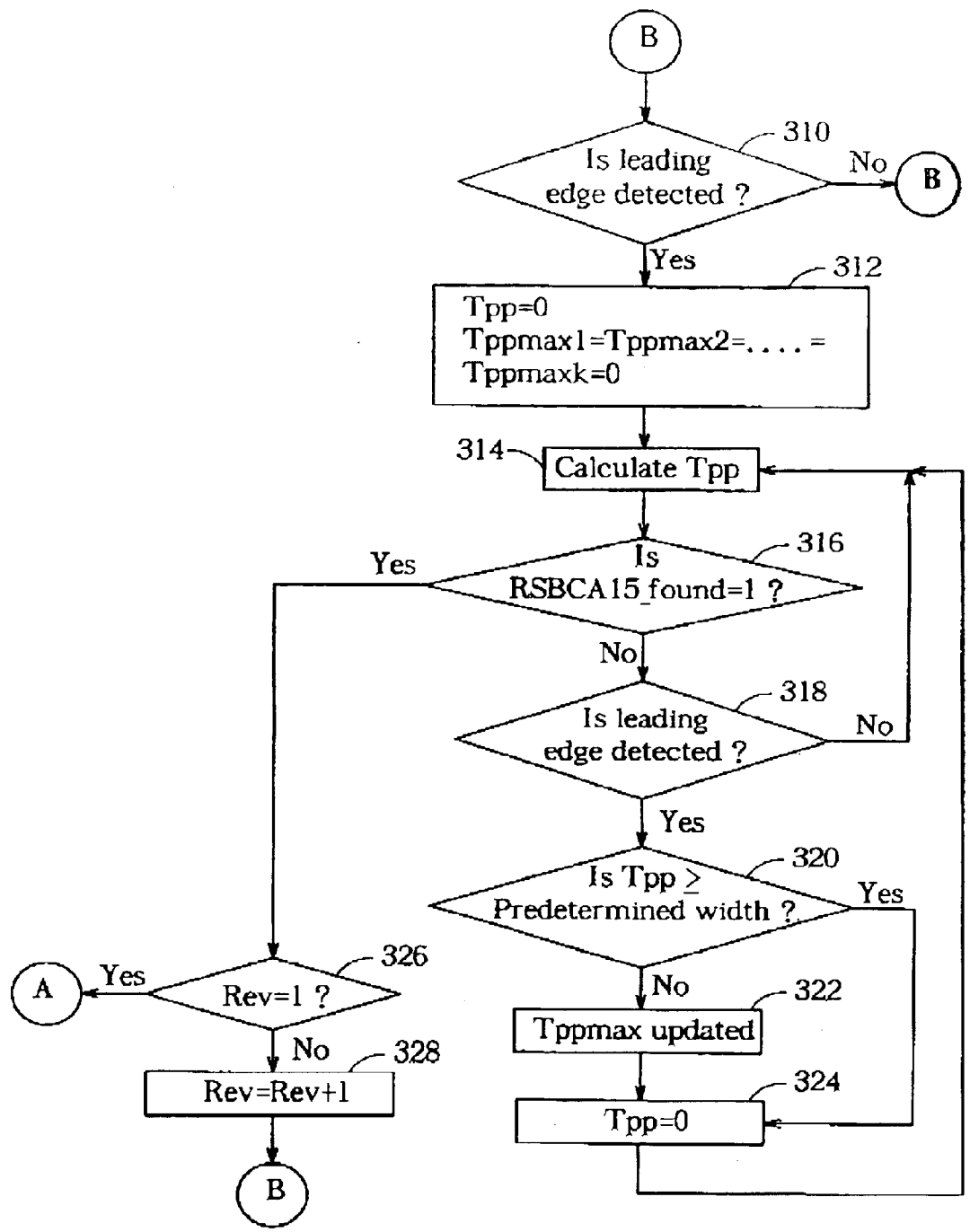

Please refer to FIG. 8A and FIG. 8B. FIG. 8A and FIG. 8B contain a flowchart illustrating extracting and decoding BCA-Code according to the present invention method. Steps contained in the flowchart will be explained below.

Step 300:Initialization; the BCA-Code processing unit 250 is ready for the BCA extraction and decoding process;

Step 302:Determine if a command starting the process of reading BCA data is received by the control unit 254 of the BCA-Code processing unit 250 from the microprocessor 140; if so, go to step 304; if not, go to step 300;

Step 304:The control unit 254 checks a FIX_T flag from the microprocessor 140 to determine if a fixed clock period Tfix is available for use in the BCA-Code extraction; if so, go to step 330; if not, the recovery clock period Trvy will be used, go to step 306;

Step 306:The control unit 254 initializes variables used in the BCA extraction process. A revolution counter Rev is used to keep track of how many revolutions the spindle motor 112 has made. The revolution counter Rev is initialized to 0. T is set equal to the recovery clock period Trvy, which is by default set to Tppmax1/4 and can be changed to any one of Tppmax2/4, Tppmax3/4, . . . Tppmaxk/4 by commands from the microprocessor 140. The Tppmax1, Tppmax2, . . . Tppmaxk are a set of variables used for storing maximum values of Tpp, and each represents the time width between succeeding leading edges of the BCA_RZ signals and is expressed in cycles of a fixed clock CLKh;

Step 308:The control unit 254 determines if a command from the microprocessor 140 is received for triggering operation of the bit width recovery circuit 252; if so, go to step 310; if not, go to step 306;

Step 310:Determine if a first leading edge of the BCA_RZ signal is detected; if so, go to step 312; if not, go to step 310;

Step 312:Initialize variables used for calculating the channel bit width. Tpp is set equal to 0. In addition, Tppmax1, Tppmax2, . . . Tppmaxk are all set equal to 0;

Step 314:The value of Tpp is calculated by measuring the time period between succeeding leading edges of the BCA_RZ signal;

Step 316:Determine if a flag RSBCA15_found is equal to 1, representing that the, last resync byte has been detected; if so, go to step 326; if not, go to step 318;

Step 318:Determine if a second leading edge of the BCA_RZ signal is detected; if so, a new value of Tpp is calculated, go to step 320; if not, go to step 314;

Step 320:Determine if the new value of Tpp is larger than a predetermined width; if so, this new value of Tpp is erroneous, and is filtered out, go to step 324; if not, go to step 322;

Step 322:If necessary, the variables used for storing maximum values of Tpp including Tppmax1,Tppmax2, . . . Tppmaxk are updated. In this disclosure, the value of Tppmax1 represents the largest detected value of Tppmax, and Tppmax2 represents the second largest value, and so on. An algorithm is included below to show how the values of Tppmax1, Tppmax2, . . . Tppmaxk are updated.

```
if (Tpp >= Tppmax1) {
    Tppmaxk = Tppmaxk-,;
    ...
    Tppmax2 = Tppmax1;
    Tppmax1 = Tpp;
    //Tppmax1 end all lower values are updated
}
else if (Tpp >= Tppmax2) {
    Tppmaxk = Tppmaxk-,;
    ...
    Tppmax3 = Tppmax2;
    Tppmax2 = Tpp;
    //Tppmax2 and all lower values are updated
}
...
...
else if (Tpp >= Tppmaxk) {
    Tppmaxk = Tpp;
    //Only Tppmaxk is updated
}
else {
    Tppmax1 = Tppmax1;
    Tppmax2 = Tppmax2;
    ...
    Tppmaxk = Tppmaxk;
    //No values changed (these steps are optional)
}
```

Step 324:Since the values of Tppmax1, Tppmax2, . . . Tppmaxk have already been updated with the new value of Tpp, Tpp is then initialized back to 0; go to step 314;

Step 326:Determine if the revolution counter Rev is equal to 1. If so, the RSBCA15_found flag has already been found equal to 1 for the first and second revolutions of the spindle motor 112. This indicates the whole BCA has been traversed and the recovery clock period Trvy is set equal to one of Tppmax1/4, Tppmax2/4, . . . Tppmaxk/4 and BCA-Code extraction and decoding will be performed using T=Trvy, go to step 334. If not, the RSBCA15_found flag has only been found equal to 1 for the first revolution of the spindle motor 112, go to step 328;

Step 328:Increment the revolution counter Rev by 1, go to step 310;

Step 330:Since a fixed clock period Tfix expressed in cycles of the fixed clock CLKh is available, T is set equal to Tfix for performing the BCA decoding;

Step 332:The control unit 254 determines if a command from the microprocessor 140 has been received instructing the start of the BCA decoding process; if so, go to step 334; if not, go to step 330;

Step 334:The bit width recovery circuit 252 is disabled. The BCA-Code is extracted and the BCA-Code decoding unit 144 is enabled to decode BCA-Code using the appropriate value of T, where the value of T is set to either Trvy or Tfix;

Step 336:The microprocessor 140 determines if a confirmation signal DECODE_OK is received from the BCA-Code decoding unit 144; if so, the BCA decoding process was successful, go to step 300; if not, go to step 338; and Step 338:Determine if a predetermined time has elapsed; if so, there was a problem with decoding the BCA-Code, go to step 300; if not, continue to decoding the BCA-Code, go to step 334;

As shown above, the present invention method can decode BCA-Code using either a fixed clock period Tfix that is provided through the feedback signal Fg from the spindle motor 112 or through the recovery clock period Trvy that is calculated by the bit width recovery circuit 252. Therefore, even if the optical disc drive 100 includes a spindle motor 112 that does not provide the feedback signal Fg, the present invention method can still quickly and efficiently extract and decode the BCA-Code from the optical disc 110. If the recovery clock period Trvy is calculated by the BCA-Code processing unit 250, accuracy of the value of Trvy is ensured by recognizing the sync and resync bytes twice and by twice reading the RSBCA15_found flag in step 316.

As noted above, the present invention sets T=Trvy, where Trvy is a value between 8.39*Fh/r and 9.39*Fh/r when the bit width recovery process finished, according to the BCA specification. The following explanation will prove that any chosen value of Trvy between these upper and lower boundary values, is capable of being used to extract and decode the BCA-Code.

Trvy is always updated in the bit width recovery process. The NRZ transformation circuit 258, extraction clock generation circuit 260, BCA-CODE extraction circuit 262 and sync/resync detection circuit 264 all operate according to the newest Trvy while the bit width recovery process is performed. Therefore the RSBCA15_found flag can be set to the value of 1 and indicate a proper Trvy has been found once Trvy is equal to a value between 8.39*Fh/r and 9.39*Fh/r in the bit width recovery process.

Please refer to FIG. 9A through FIG. 9H. FIG. 9A through FIG. 9H are timing diagrams illustrating BCA-Code extraction method according to the preferred embodiment. Referring back to Eqn.2 and Eqn.3 above, assume that Fh/r is set equal to 1. Therefore, Tppmax is a value between 33.56 and 37.56 cycles of CLKh, and Trvy is a value between 8.39 and 9.39 cycles of CLKh. FIG. 9A through FIG. 9H show cases in which T=Trvy=8.39 cycles of CLKh. For situations in which n=1, 2, 3, and 4, all extreme cases will be used to prove that the present invention is capable of extracting BCA-Code using the recovery clock period Trvy. The dotted lines represent the BCA_NRZ signal that is created by transferring the BCA_RZ to NRZ format based on Trvy. As an example, the following diagrams show samples being taken halfway through a period of the recovery clock period Trvy. It should be noted, however, that the present invention could also correctly sample at other times within the recovery clock period Trvy. For simplicity, all times mentioned will be expressed as cycles of CLKh, and units will not be specified.

As illustrated in FIG. 9A, a case in which n=1 is shown with Tpp=8.89 2=6.89. A first leading edge is detected at time=0. Since T=8.39, a sample will then be taken at 8.39/2=4.1,95. Therefore, the extraction clock generation circuit 260 outputs a sampling clock signal CLKs so that a first sample is taken at time=4.195, and a value of "1" is detected for the BCA-Code. Next, another leading edge is detected at time=6.89. Therefore, the extraction clock generation circuit 260 outputs another sampling clock signal CLKs at time=6.89+8.39/2=11.085. This second sample detects a value of "1" for the BCA-Code. Thus, a pattern of (1, 1) is extracted from the BCA-Code.

As illustrated in FIG. 9B, a case in which n=1 is shown with Tpp=8.89+2=10.89. A first leading edge is detected at time=0. Since T=8.39, a sample will then be taken at 8.39/2=4.195, and a value of "1" is detected for the BCA-Code. Next, another leading edge is detected at time=10.89. However, in the preferred embodiment instead of taking another sample at time=8.39+8.39/2=12.585, the extraction clock generation circuit 260 resets the generation time of the next sampling clock signal CLKs outputted, and instead outputs the next sampling clock signal CLKs at time=10.89+8.39/2=15.085. Therefore, a value of "1" is detected for the BCA-Code. Thus, a pattern of (1, 1) is extracted from the BCA-Code.

As illustrated in FIG. 9C, a case in which n=2 is shown with Tpp=8.89*2 2=15.78. A first leading edge is detected at time=0. Since T=8.39, a sample will then be taken at 8.39/2=4.195, and a value of "1" is detected for the BCA-Code. Then, another sample is taken at time=4.195+8.39=12.585, and a value of "0" is detected for the BCA-Code. Next, another leading edge is detected at time=15.78. Therefore, the extraction clock generation circuit 260 outputs another sampling clock signal CLKs at time=15.78+8.39/2=19.975. This sample detects a value of "1" for the BCA-Code. Thus, a pattern of (1, 0, 1) is extracted from the BCA-Code.

As illustrated in FIG. 9D, a case in which n=2 is shown with Tpp=8.89*2+2=19.78. A first leading edge is detected at time=0. Since T=8.39, a sample will then be taken at 8.39/2=4.195, and a value of "1" is detected for the BCA-Code. Then, another sample is taken at time=4.195+8.39=12.585, and a value of "0" is detected for the BCA-Code. Next, another leading edge is detected at time=19.78. Also in the preferred embodiment, instead of taking another sample at time=12.585+8.39=20.975, the extraction clock generation circuit 260 resets the generation time of the next sampling clock signal CLKs outputted, and instead outputs the next sampling clock signal CLKs at time=19.78+8.39/2=23.975. Therefore, a value of "1" is detected for the BCA-Code. Thus, a pattern of (1, 0, 1) is extracted from the BCA-Code.

As illustrated in FIG. 9E, a case in which n=3 is shown with Tpp=8.89*3 2=24.67. A first leading edge is detected at time=0. Since T=8.39, a sample will then be taken at 8.39/2=4.195, and a value of "1" is detected for the BCA-Code. Then, another sample is taken at time=4.195+8.39=12.585, and a value of "0" is detected for the BCA-Code. Then, another sample is taken at time=12.585+8.39=20.975, and a value of "0" is detected for the BCA-Code. Next, another leading edge is detected at time=24.67. Therefore, the extraction clock generation circuit 260 outputs another sampling clock signal CLKs at time=24.67+8.39/2=28.865.

This sample detects a value of "1" for the BCA-Code. Thus, a pattern of (1, 0, 0, 1) is extracted from the BCA-Code.

As illustrated in FIG. 9F, a case in which n=3 is shown with Tpp=8.89*3+2=28.67. A first leading edge is detected at time=0. Since T=8.39, a sample will then be taken at 8.39/2=4.195, and a value of "1" is detected for the BCA-Code. Then, another sample is taken at time=4.195+8.39=12.585, and a value of "0" is detected for the BCA-Code. Then, another sample is taken at time=12.585+8.39=20.975, and a value of "0" is detected for the BCA-Code. Next, another leading edge is detected at time=28.67. Also in the preferred embodiment, instead of taking another sample at time=20.975+8.39=29.365, the extraction clock generation circuit 260 resets the generation time of the next sampling clock signal CLKs outputted, and instead outputs the next sampling clock signal CLKs at time=28.67+8.39/2=32.865. Therefore, a value of "1" is detected for the BCA-Code. Thus, a pattern of (1, 0, 0, 1) is extracted from the BCA-Code.

As illustrated in FIG. 9G, a case in which n=4 is shown with Tpp=8.89*4 2=33.56. A first leading edge is detected at time=0. Since T=8.39, a sample will then be taken at 8.39/2=4.195, and a value of "1" is detected for the BCA-Code. Then, another sample is taken at time=4.195+8.39=12.585, and a value of "0" is detected for the BCA-Code. Then, another sample is taken at time=12.585+8.39=20.975, and a value of "0" is detected for the BCA-Code. Again, another sample is taken at time=20.975+8.39=29.365, and a value of "0" is detected for the BCA-Code. Next, another leading edge is detected at time=33.56. Therefore, the extraction clock generation circuit 260 outputs another sampling clock signal CLKs at time=33.56+8.39/2=37.755. This sample detects a value of "1" for the BCA-Code. Thus, a pattern of (1, 0, 0,0, 1) is extracted from the BCA-Code.

As illustrated in FIG. 9H, a case in which n=4 is shown with Tpp=8.89*4+2=37.56. A first leading edge is detected at time=0. Since T=8.39, a sample will then be taken at 8.39/2=4.195, and a value of "1" is detected for the BCA-Code. Then, another sample is taken at time=4.195+8.39=12.585, and a value of "0" is detected for the BCA-Code. Then, another sample is taken at time=12.585+8.39=20.975, and a value of "0" is detected for the BCA-Code. Again, another sample is taken at time=20.975+8.39=29.365, and a value of "0" is detected for the BCA-Code. Next, another leading edge is detected at time=37.56. Also in the preferred embodiment, instead of taking another sample at time=29.365+8.39=37.755, the extraction clock generation circuit 260 resets the generation time of the next sampling clock signal CLKs outputted, and instead outputs the next sampling clock signal CLKs at time=37.56+8.39/2=41.755. Therefore, a value of "1" is detected for the BCA-Code. Thus, a pattern of (1, 0, 0,0, 1) is extracted from the BCA-Code.

As seen in FIG. 9A through FIG. 9H, even if a value of the recovery clock period Trvy used for T is at the lower boundary of the BCA specification, proper BCA extraction can occur. In each of the cases, all data bits in the BCA-Code were extracted correctly with the present invention method.

Please refer to FIG. 10A through FIG. 10H. FIG. 10A through FIG. 10H are timing diagrams illustrating BCA-Code extraction method according to the preferred embodiment. FIG. 10A through FIG. 10H show cases in which T=Trvy=9.39 cycles of the fixed clock CLKh.

As illustrated in FIG. 10A, a case in which n=1 is shown with Tpp=8.89 2=6.89. A first leading edge is detected at time=0. Since T=9.39, a sample will then be taken at 9.39/2=4.695. Therefore, the extraction clock generation circuit 260 outputs a sampling clock signal CLKs so that a first sample is taken at time=4.695, and a value of "1" is detected for the BCA-Code. Next, another leading edge is detected at time=6.89. Therefore, the extraction clock generation circuit 260 outputs another sampling clock signal CLKs at time=6.89+9.39/2=11.585. This second sample detects a value of "1" for the BCA-Code. Thus, a pattern of (1, 1) is extracted from the BCA-Code.

As illustrated in FIG. 10B, a case in which n=1 is shown with Tpp=8.89+2=10.89. A first leading edge is detected at time=0. Since T=9.39, a sample will then be taken at 9.39/2=4.695, and a value of "1" is detected for the BCA-Code. Next, another leading edge is detected at time=10.89.

In this embodiment, instead of taking another sample at time=9.39+9.39/2=14.085, the extraction clock generation circuit 260 resets the generation time of the next sampling clock signal CLKs outputted, and instead outputs the next sampling clock signal CLKs at time=10.89+9.39/2=15.585. Therefore, a value of "1" is detected for the BCA-Code. Thus, a pattern of (1, 1) is extracted from the BCA-Code.

As illustrated in FIG. 10C, a case in which n=2 is shown with Tpp=8.89*2 2=15.78. A first leading edge is detected at time=0. Since T=9.39, a sample will then be taken at 9.39/2=4.695, and a value of "1" is detected for the BCA-Code. Then, another sample is taken at time=4.695+9.39=14.085, and a value of "0" is detected for the BCA-Code. Next, another leading edge is detected at time=15.78. Therefore, the extraction clock generation circuit 260 outputs another sampling clock signal CLKs at time=15.78+9.39/2=20.475. This sample detects a value of "1" for the BCA-Code. Thus, a pattern of (1, 0, 1) is extracted from the BCA-Code.

As illustrated in FIG. 10D, a case in which n=2 is shown with Tpp=8.89*2+2=19.78. A first leading edge is detected at time=0. Since T=9.39, a sample will then be taken at 9.39/2=4.695, and a value of "1" is detected for the BCA-Code.

Then, another sample is taken at time=4.695+9.39=14.085, and a value of "0" is detected for the BCA-Code. Next, another leading edge is detected at time=19.78. Also in this embodiment, instead of taking another sample at time=14.085+9.39=23.475, the extraction clock generation circuit 260 resets the generation time of the next sampling clock signal CLKs outputted, and instead outputs the next sampling clock signal CLKs at time=19.78+9.39/2=24.475. Therefore, a value of "1" is detected for the BCA-Code. Thus, a pattern of (1, 0, 1) is extracted from the BCA-Code.

As illustrated in FIG. 10E, a case in which n=3 is shown with Tpp=8.89*3 2=24.67. A first leading edge is detected at time=0. Since T=9.39, a sample will then be taken at 9.39/2=4.695, and a value of "1" is detected for the BCA-Code. Then, another sample is taken at time=4.695+9.39=14.085, and a value of "0" is detected for the BCA-Code. Then, another sample is taken at time=14.085+9.39=23.475, and a value of "0" is detected for the BCA-Code. Next, another leading edge is detected at time=24.67. Therefore, the extraction clock generation circuit 260 outputs another sampling clock signal CLKs at time=24.67+9.39/2=29.365. This sample detects a value of "1" for the BCA-Code. Thus, a pattern of (1, 0, 0, 1) is extracted from the BCA-Code.

As illustrated in FIG. 10F, a case in which n=3 is shown with Tpp=8.89*3+2=28.67. A first leading edge is detected at time=0. Since T=9.39, a sample will then be taken at 9.39/2=4.695, and a value of "1" is detected for the BCA-Code. Then, another sample is taken at time=4.695+9.39=14.085, and a value of "0" is detected for the BCA-Code. Then, another sample is taken at time=14.085+9.39=23.475, and a value of "0" is detected for the BCA-Code. Next, another leading edge is detected at time=28.67. Also in this embodiment, instead of taking another sample at time=23.475+9.39=32.865, the extraction clock generation circuit 260 resets the generation time of the next sampling clock signal CLKs outputted, and instead outputs the next sampling clock signal CLKs at time=28.67+9.39/2=33.365.

Therefore, a value of "1" is detected for the BCA-Code. Thus, a pattern of (1, 0, 0, 1) is extracted from the BCA-Code.

As illustrated in FIG. 10G, a case in which n=4 is shown with Tpp=8.89*4 2=33.56. A first leading edge is detected at time=0. Since T=9.39, a sample will then be taken at 9.39/2=4.695, and a value of "1" is detected for the BCA-Code. Then, another sample is taken at time=4.695+9.39=14.085, and a value of "0" is detected for the BCA-Code. Then, another sample is taken at time=14.085+9.39=23.475, and a value of "0" is detected for the BCA-Code. Again, another sample is taken at time=23.475+9.39=32.865, and a value of "0" is detected for the BCA-Code. Next, another leading edge is detected at time=33.56. Therefore, the extraction clock generation circuit 260 outputs another sampling clock signal CLKs at time=33.56+9.39/2=38.255. This sample detects a value of "1" for the BCA-Code. Thus, a pattern of (1, 0, 0, 0, 1) is extracted from the BCA-Code.

As illustrated in FIG. 10H, a case in which n=4 is shown with Tpp=8.89*4+2 =37.56. A first leading edge is detected at time=0. Since T=9.39, a sample will then be taken at 9.39/2=4.695, and a value of "1" is detected for the BCA-Code. Then, another sample is taken at time=4.695+9.39=14.085, and a value of "0" is detected for the BCA-Code. Then, another sample is taken-at time=14.085+9.39=23.475, and a value of "0" is detected for the BCA-Code. Again, another sample is taken at time=23.475+9.39=32.865, and a value of "0" is detected for the BCA-Code. Next, another leading edge is detected at time=37.56. In this case, the extraction clock generation circuit 260 does not need to reset the generation time of the next sampling clock signal CLKs outputted. Therefore, the next sampling clock signal CLKs is outputted at time=32.865+9.39=42.255, Therefore, a value of "1" is detected for the BCA-Code. Thus, a pattern of (1, 0, 0, 0, 1) is extracted from the BCA-Code.

As seen in FIG. 10A through FIG. 10H, even if a value of the recovery clock period Trvy used for T is at the upper boundary of the BCA specification, proper BCA extraction can occur. In each of the cases, all data bits in the BCA-Code were extracted correctly with the present invention method.

FIG. 9A through FIG. 10H show that if T is set to any value of Trvy between 8.39* Fh/r and 9.39*Fh/r cycles of CLKh, proper BCA extraction can occur. Therefore, if Tfix were used instead of Trvy for the value of T, as long as Tfix is in this range, Tfix can also be used for BCA extraction.

As mentioned above, BCA-Code and NBCA-Code have essentially the same format. Therefore, the present invention is not limited to extracting BCA-Code, but can also be used for extracting NBCA-Code with the method described above. It should be noted that the term "cutting area (CA)" or "cutting area code (CA code)" is to be construed as an area having the general properties described in the embodiment, and shall not preclude other areas or codes having the properties of a CA described herein from being construed as an equivalent of a CA.

Those skilled in the art will readily observe that numerous modifications and alterations of the device may be made while retaining the teachings of the invention.

Accordingly, the above disclosure should be construed as limited only by the metes and bounds of the appended claims.

What is claimed is:

1. A method for extracting information in a data signal stored on an optical disc, the information being stored in a plurality of channel bits, the method comprising steps:
   (a) initializing a recovery period of a recovery clock to a first predetermined value expressed in cycles of a first clock;
   (b) sampling the data signal with the first clock;
   (c) obtaining a leading edge time period expressed in cycles of the first clock of a pattern of bits from the sampled data in which at least a first bit has a first binary value, followed by a plurality of bits having a second binary value, and ending with a last bit having the first binary value, wherein the first and second binary values are not equal;

(d) updating the recovery period of the recovery clock to be equal to a new maximum period that is the leading edge time period divided by a division factor;

(e) extracting the information in the data signal based on the newest recovery period of the recovery clock while steps (b) through (d) are operating;

(f) repeating steps (b) through (e) until a predetermined code is detected in the data signal; and (g) extracting the information in the data signal based on the finalized recovery period of the recovery clock determined by steps (a) through (f).

2. The method of claim 1 wherein in step (d) the recovery period is updated to be equal to the new maximum period if the new maximum period is larger than a previous maximum period and less than a second predetermined value.

3. The method of claim 1 wherein the first binary value is "1" and the second binary value is "0".

4. The method of claim 1 wherein the division factor is four.

5. The method of claim 1 wherein steps (e) and (g) further comprise adjusting a next extracting time to extract the data signal in response to detection of a sampled data signal bit with the first clock having the first binary value.

6. The method of claim 1 wherein the data signal is a burst cutting area (BCA) signal stored in a BCA of an optical disc and the information is BCA information.

7. The method of claim 6 wherein the predetermined code is an RSBCA15 resync code.

8. The method of claim 7 wherein the RSBCA15 resync code is detected twice before performing step (g).

9. The method of claim 1 wherein the data signal is a narrow burst cutting area (NBCA) signal stored in an NBCA of an optical disc and the information is NBCA information.

10. The method of claim 9 wherein the predetermined code is an RSNBCA15 resync code.

11. The method of claim 10 wherein the RSNBCA15 resync code is detected twice before performing step (g).

12. An optical disc storage system for extracting cutting area (CA) information in a CA signal stored on a CA of an optical disc, the CA information being stored in a plurality of channel bits, the optical disc storage system comprising:

a CA signal processing unit for processing the CA information stored in the CA, the CA signal processing unit comprising:

a bit width recovery circuit for initializing a recovery period of a recovery clock to a first predetermined value expressed in cycles of a first clock; sampling the CA signal with the first clock; obtaining a leading edge time period expressed in cycles of the first clock of a pattern of bits from the sampled data in which at least a first bit has a first binary value, followed by a plurality of bits having a second binary value, and ending with a last bit having the first binary value, wherein the first and second binary values are not equal; and updating the recovery period of the recovery clock to be equal to a new maximum period that is the leading edge time period divided by a division factor if the new maximum period is larger than a previous maximum period and less than a second predetermined value; and a CA signal extraction unit for extracting the CA information in the CA signal; and a sync and resync detection circuit for detecting sync and resync codes stored in the CA.

13. The storage system of claim 12 wherein the first binary value is "1" and the second binary value is "0".

14. The storage system of claim 12 wherein the division factor is four.

15. The storage system of claim 12 wherein the CA information is burst cutting area (BCA) information, the CA signal is a BCA signal, and the CA of the optical disc is a BCA of the optical disc.

16. The storage system of claim 15 wherein the bit width recovery circuit samples the BCA signal with the first clock until the sync and resync detection circuit detects an RSBCA15 resync code.

17. The storage system of claim 16 wherein the sync and resync detection circuit detects the RSBCA15 resync code twice before a CA signal decoding unit decodes the BCA information stored in the BCA.

18. The storage system of claim 12 wherein the CA information is narrow burst cutting area (NBCA) information, the CA signal is an NBCA signal, and the CA of the optical disc is an NBCA of the optical disc.

19. The storage system of claim 18 wherein the bit width recovery circuit samples the NBCA signal with the first clock until the sync and resync detection circuit detects an RSNBCA15 resync code.

20. The storage system of claim 19 wherein the sync and resync detection circuit detects the RSNBCA15 resync code twice before a CA signal decoding unit decodes the NBCA information stored in the NBCA.

* * * * *